United States Patent [19]

Bartee

[11] Patent Number: 5,010,211
[45] Date of Patent: Apr. 23, 1991

[54] FLUSHING FLOOR FITTING
[75] Inventor: Edward C. Bartee, Fairfield, Ohio
[73] Assignee: Square D Company, Palatine, Ill.
[21] Appl. No.: 373,414
[22] Filed: Jun. 29, 1989
[51] Int. Cl.⁵ ............................................. H02G 3/18
[52] U.S. Cl. ......................................... 174/48; 174/67
[58] Field of Search ............................. 174/48, 49, 67; 220/242; 52/221; 439/135, 136, 142

[56] References Cited

U.S. PATENT DOCUMENTS

| | | | |
|---|---|---|---|
| 3,701,837 | 10/1972 | Fork | 174/50 |
| 3,956,573 | 5/1976 | Myers et al. | 174/48 |
| 4,096,347 | 6/1978 | Penczak et al. | 174/48 |
| 4,289,921 | 9/1981 | Gartner et al. | 174/48 |
| 4,297,524 | 10/1981 | Fork | 174/48 |
| 4,338,484 | 7/1982 | Littrell | 174/48 |
| 4,443,654 | 4/1984 | Flachbarth et al. | 174/48 |
| 4,465,897 | 8/1984 | Albrecht | 174/48 |
| 4,536,612 | 8/1985 | Domigan | 174/48 |
| 4,591,656 | 5/1986 | Mohr | 174/48 |
| 4,593,507 | 6/1986 | Hartman | 52/221 |
| 4,638,115 | 1/1987 | Benscoter | 174/48 |

Primary Examiner—Leo P. Picard
Assistant Examiner—David A. Tone
Attorney, Agent, or Firm—Larry I. Golden

[57] ABSTRACT

An electrical duct system is provided having a flush floor fitting associated with a multi-cell duct placed in the floor. A top wall of the duct has a central access opening and two outer access openings communicated with a central cell and two outer cells of the duct. An access housing is located in top of the duct. A trim ring on top of the access housing has first, second and third mounting spaces for mounting outlet devices therein. A divider is located in the housing and divides the interior of the housing into first, second and third chambers associated with the first, second and third mounting spaces of the trim ring. The first and third chambers overlie and are communicated with the central access opening of the duct. The second chamber extends between the first and third chambers and is communicated with both of the outer access openings of the duct and is isolated from the central access opening. The divider is telescopingly extendable to accommodate different heights of access housings. The divider is pivotally mounted within the access housing. Additionally, a face plate and pivotable cover lid assembly is provided which is received within a recess in the trim ring.

24 Claims, 7 Drawing Sheets

FLUSHING FLOOR FITTING

This invention relates generally to electrical raceway or duct systems designed to be included in a poured concrete floor, and more particularly to flush floor fittings designed for use with such systems.

BACKGROUND OF THE INVENTION

There are several well known types of electrical raceway systems which are designed to be placed in a floor. There are, for example, "underfloor" raceways as defined in Article 354 of the National Electrical Code and "cellular metal floor raceways" as defined in Article 356 of the National Electrical Code. The present invention is disclosed in conjunction with an underfloor raceway, but in many of its aspects is applicable to use with other raceway systems designed to be placed in a floor.

Flush floor fittings are typically designed for use in relatively shallow concrete slabs where it is necessary to place the electrical outlets, such as duplex electrical power outlets, facing upward substantially flush with the floor surface, rather than to recess those outlets into a cavity in the floor.

Also, it is common practice to utilize multi-cell ducts carrying both high potential electrical power cables and low potential communication cables or the like. When providing a flush floor fitting for accessing these multiple electrical services, it is desirable to provide dividers within the fitting to isolate the high potential wiring from the low potential wiring.

A typical example of a prior art flush floor fitting designed for use with multi-cell ducts is shown in U.S. Pat. No. 4,338,484 to Littrell. The Littrell patent utilizes a three cell duct having high potential power cables in the center cell. A flush access unit utilizes a divider plate for isolating the high potential wiring from low potential wiring within the fitting, and provides for the flush mounting of two spaced duplex electrical power outlets separated by low potential outlets.

Also, there are a number of other electrical fitting designs utilizing various dividers for isolating high potential wiring from low potential wiring. Examples are seen in U.S. Pat. No. 4,638,115 to Benscoter; U.S. Pat. No. 4,536,612 to Domigan; and U.S. Pat. No. 4,593,507 to Hartman.

It is also common practice to utilize pivotable cover lids to cover the flush mounted power outlets when they are not in use. Several examples of such pivotable cover lids are seen in U.S. Pat. No. 4,591,656 to Mohr; U.S. Pat. No. 4,443,654 to Flachbarth et al.; U.S. Pat. No. 4,297,524 to Fork; and U.S. Pat. No. 4,289,921 to Gartner et al.

SUMMARY OF THE INVENTION

The present invention provides a number of improvements in flush floor fittings and related structures.

A triple flush floor fitting is provided for use with a duct having three parallel cells within the duct, and having a central access opening and two outer access openings defined through a top wall of the duct and communicated with the central cell and two outer cells of the duct.

The fitting includes an access unit housing having an open bottom and an open top. The housing is attached to the top wall of the duct so that the open bottom of the housing is communicated with the central and two outer access openings.

A trim ring is connected to the open top of the housing and has first, second and third mounting means defined therein for mounting outlet devices therein substantially flush with a floor surface. The first, second and third mounting means are aligned in a direction generally parallel to the length of the duct with the second mounting means located in line between the first and third mounting means.

A divider means is located in the housing for dividing an interior of the housing into spaced first and third chambers, each partially overlying and communicated with the central access opening of the duct and isolated from the two outer access openings of the duct. A second chamber extends between the first and third chambers and is communicated with both the two outer access openings and is isolated from the central access opening of the duct. The first, second and third chambers are communicated with the first, second and third mounting means, respectively, of the trim ring.

The divider means is a telescoping divider means which is extendable to accommodate a plurality of different available height access unit housings.

A novel mounting arrangement for the divider means is provided. The access unit housing includes a pair of aligned pivot posts extending inwardly therefrom and defining a pivotal axis. The divider has a notch means defined on one end thereof for pivotally engaging the pivot post so that the divider can pivot about the pivotal axis during installation thereof within the housing. A latch means is provided for latching the divider in an installed position.

Additionally, a novel arrangement is provided for the mounting of a pair of pivotable cover lids to cover the outlets of a duplex power outlet. The trim ring includes a recessed surface defining an upwardly open recess. A face plate is received in the recess, and has at least first and second hinge pin receiving cavities defined therein. At least the first cavity is open toward an adjacent area of the recessed surface of the trim ring.

A cover lid having first and second oppositely directed hinge pins extending therefrom is assembled with the face plate. The first and second hinge pins are received in the first and second hinge pin receiving cavities, respectively, with the first hinge pin being trapped in the first cavity of the face plate by the mentioned adjacent area of the recess surface of the trim ring.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

In FIG. 2, the grommet has been placed in the central access opening of the duct, and the divider member has been installed in the preset housing. Only the trim ring and a duplex electrical outlet are shown in the exploded position. The other components of FIG. 1 are eliminated for ease of illustration.

DETAILED DESCRIPTION OF THE PREFERRED EMBODIMENTS

Figure 1:
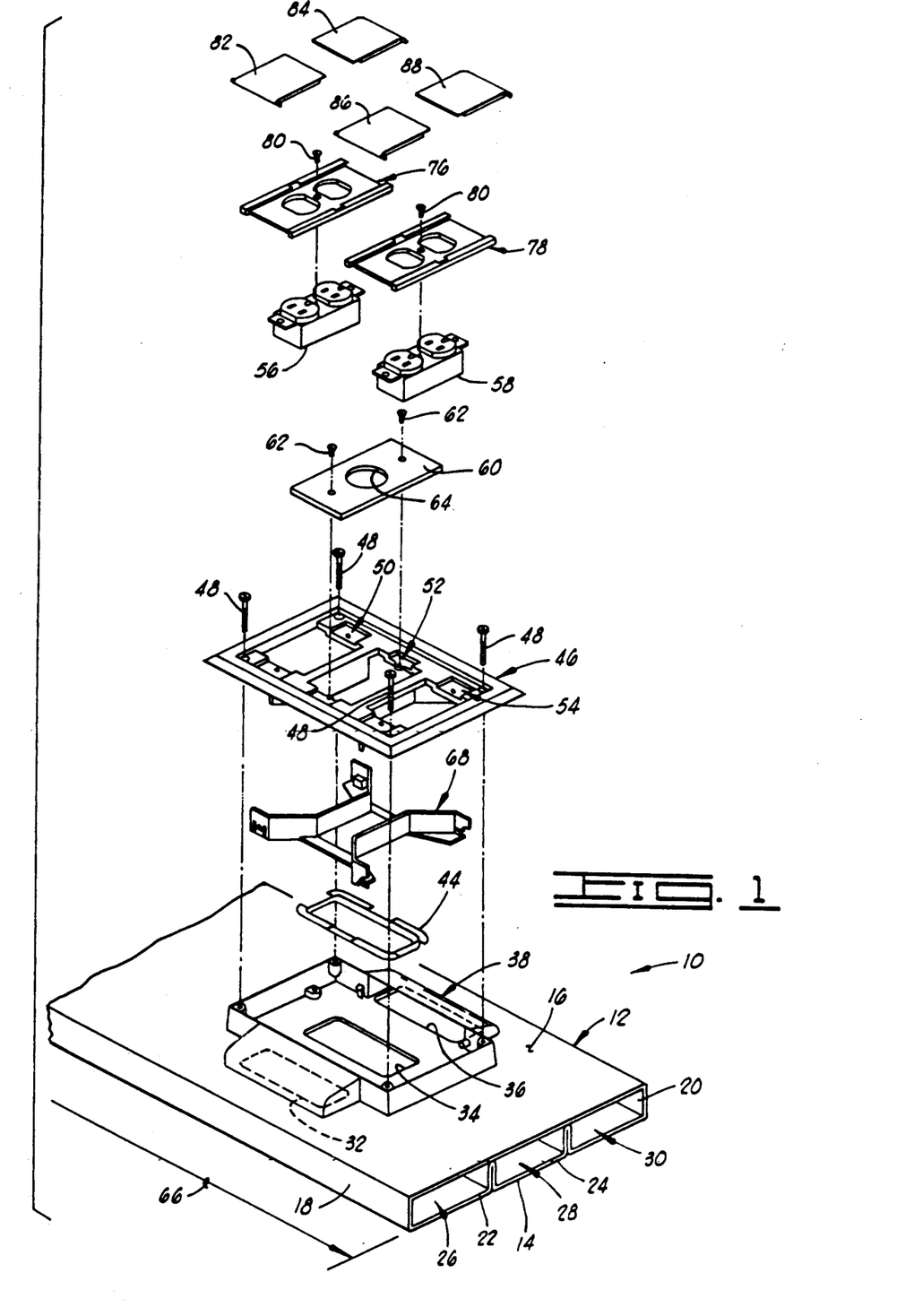
FIG. 1 is an isometric, exploded view of a triple preset housing mounted on top of a triple cell duct, along with the various structures comprising a triple flush floor fitting.

Referring now to FIG. 1, an isometric exploded view is thereshown of an electrical duct system generally designated by the numeral 10. The system 10 includes a duct generally designated by the numeral 12. Duct 12 has a bottom wall 14, top wall 16, first and second side walls 18 and 20 joining the bottom and top walls 14 and 16, and first and second interior walls 22 and 24 dividing an interior of the duct 12 into three cells 26, 28 and 30. Top wall 16 lies in substantially a single plane.

Cell 28 may be described as a central cell 28, and cells 26 and 30 may be described as outer cells 26 and 30 since they lie to either side of the central cell 28.

The top wall 16 of duct 12 has three access openings 32, 34 and 36 defined therethrough and communicated with cells 26, 28 and 30, respectively. Access opening 34 may be referred to as a central access opening 34, and access openings 32 and 36 may be referred to as outer access openings 32 and 36.

An access unit housing 38, which may also be referred to as a triple preset housing 38, is attached to the top wall 16 of duct 12. The housing 38 is best seen in the plan and elevation sectioned views in FIGS. 11 and 12. The housing 38 has an open bottom 40 of irregular shape generally corresponding to the outer profile of the housing 38 seen in the plan view of FIG. 11. Housing 38 also has a generally rectangular open top 42. The housing 38 is located upon the top wall 16 of duct 12 so that the open bottom 40 of housing 38 is communicated with the three access openings 32, 34 and 36 of the top wall 16.

As will be appreciated by those skilled in the art, the duct 12 will typically have a plurality of sets of access openings such as 32-36 located at intervals along the length of the duct 12. Preset housings like housing 38 will be located above each set of access openings, and may be selectively activated for mounting of various fittings such as for example the flush floor fitting components which are further described below.

Each group of access openings 32, 34 and 36 is laterally aligned and includes three substantially identical shaped and dimensioned access openings.

Returning to the exploded view of FIG. 1, a grommet 44 is provided for placement in the central access opening 34 to protect cabling pulled therethrough from the sharp edges of the access opening 34. Similar grommets can be placed in access openings 32 and 36.

A trim ring generally designated by the numeral 46 is connected to the open top 42 of housing 38 by a plurality of mounting screws 48. The trim ring 46 is best seen in the plan and elevation views of FIGS. 16, 17 and 18. Trim ring 46 has first, second and third mounting means 50, 52 and 54 defined therein for mounting outlet devices therein substantially flush with a surface 55 of floor 57. For example, duplex electrical power outlet devices 56 and 58 may be mounted in first and third mounting means 50 and 54. A communications outlet plate 60 may be mounted on second mounting means 52 by screws such as 62. A central opening 64 in the plate 60 may be utilized for passage of communications cables, or telephone jacks or other communication plug-ins may be located therein.

Figure 16:
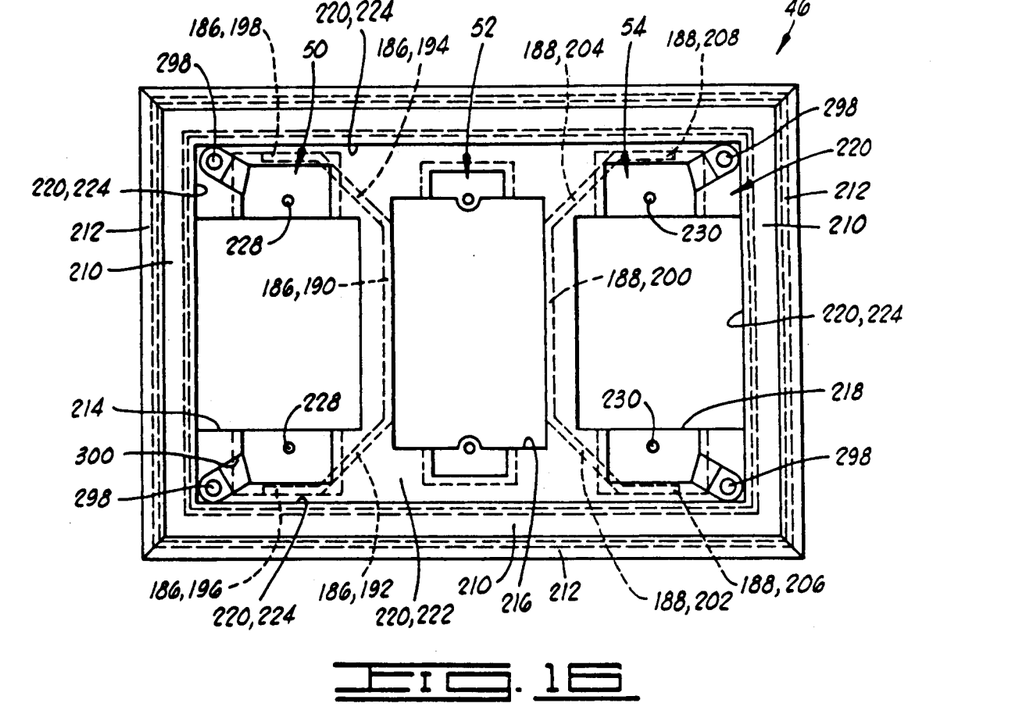
FIG. 16 is a plan view of the trim ring of FIG. 1.

The first, second and third mounting means 50, 52 and 54 of trim ring 46 are aligned in a direction generally parallel to the length 66 of duct 12 with the second mounting means 52 being located in line between the first and third mounting means 50 and 54.

Figure 2:
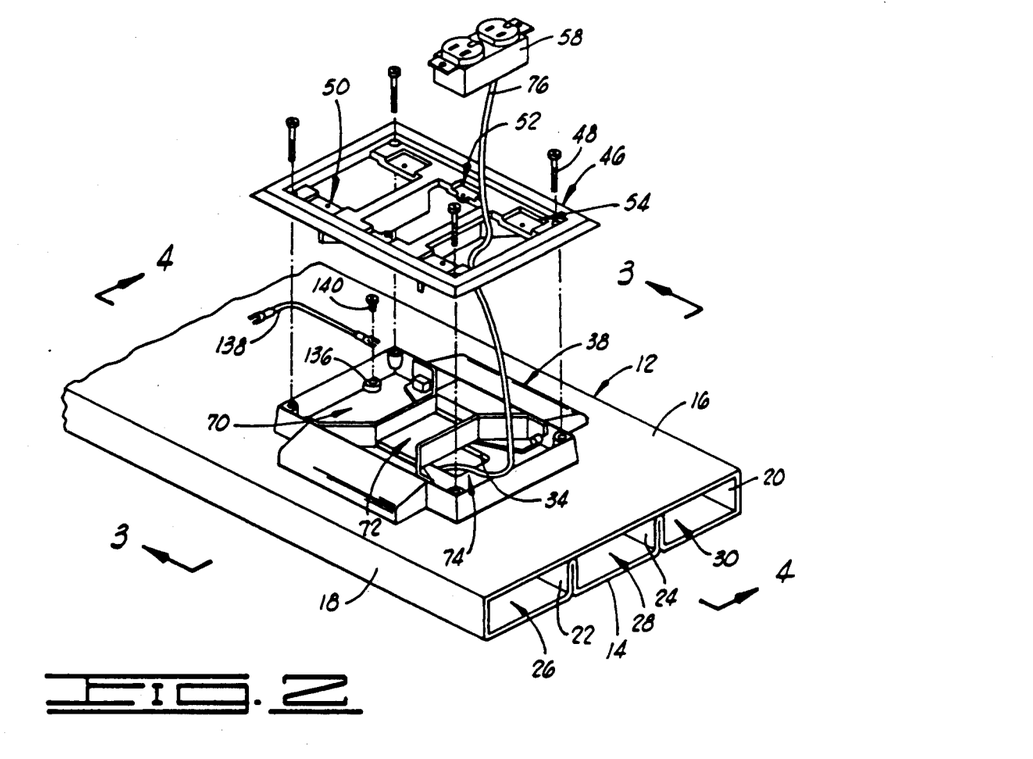
FIG. 2 is another isometric, partially exploded view of the structure of FIG. 1.

A divider means generally designated by the numeral 68 is located within the housing 38 for dividing an interior of the housing 38 into first, second and third chambers 70, 72 and 74 as generally designated in FIG. 2. The first and third chambers 70 and 74 each partially overlie and are communicated with the central access opening 34, and are isolated from the two outer access openings 32 and 36. The second chamber 72 extends between the first and third chambers 70 and 74 and is communicated with both the outer access openings 32 and 36 and is isolated from the central access opening 34.

The first, second and third chambers 70, 72 and 74 are communicated with the first, second and third mounting means 50, 52 and 54, respectively, of trim ring 46.

Typically, the central cell 28 of duct 12 will have high potential electrical power cables such as 76 (see FIG. 2) located therein, and the outer chambers 26 and 30 will have low potential electrical cables such as telephone or computer cables located therein. The first and second chambers 70 and 74 defined within the housing 38 may be described as high potential power outlet chambers and are typically utilized for mounting duplex power outlet devices 56 and 58. The second chamber 72 is utilized to provide passage for low potential cables from outer cells 26 and 30 to the communications outlet plate 60.

Figure 13:
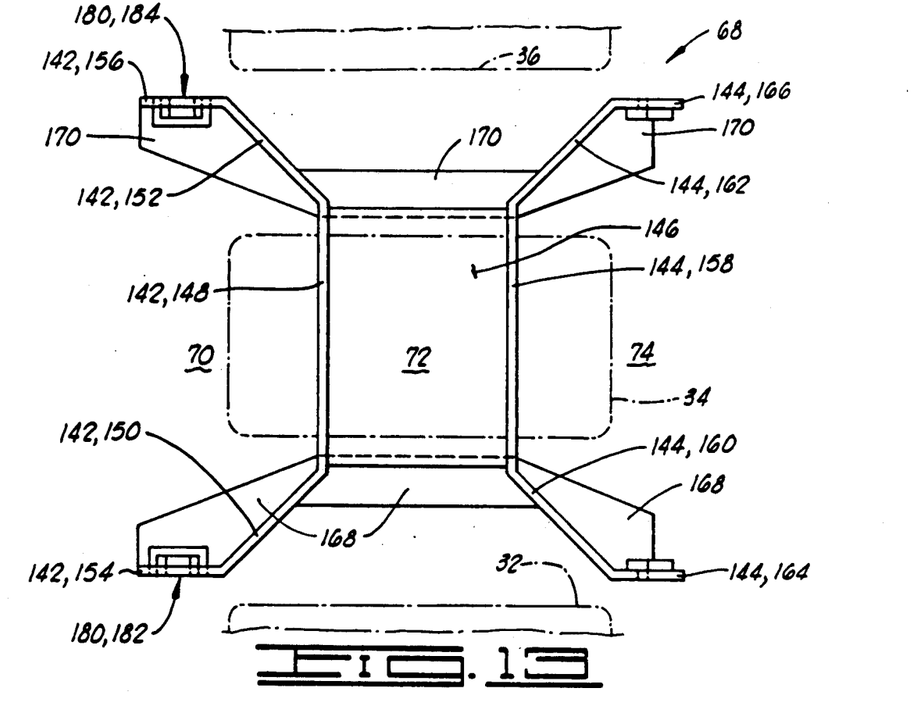
FIG. 13 is a plan view of the divider member of FIG. 1.
Figure 14:
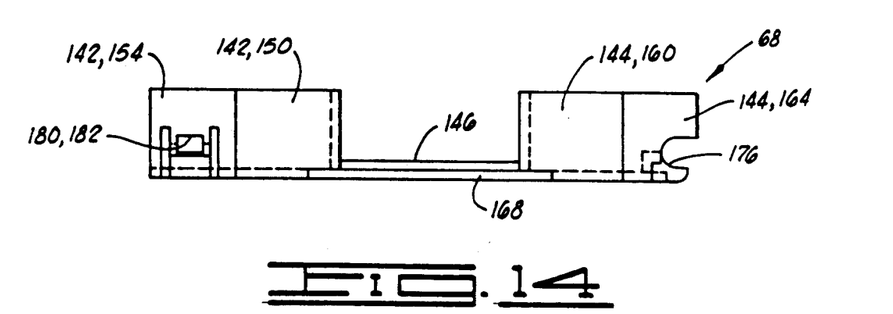
FIG. 14 is a front elevation view of the divider of FIG. 13.
Figure 15:
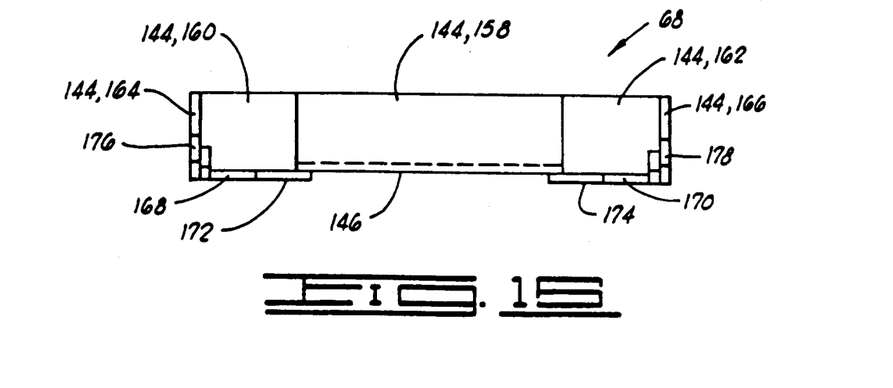
FIG. 15 is a right end elevation view of the divider of FIG. 13.

The divider means 68 is best seen in the plan and elevation views of FIGS. 13, 14 and 15.

A pair of face plates 76 and 78 are placed over the outlet devices 56 and 58 and attached thereto by screws 80. A pair of cover lids 82 and 84 are assembled with face plate 76, and a second pair of cover lids 86 and 88 are assembled with second face plate 78. The face plate 76 is best illustrated in the plan and elevation views of FIGS. 19, 20 and 21. The cover lid 82 is best illustrated in FIGS. 7, 8, 9 and 10.

Figure 11:
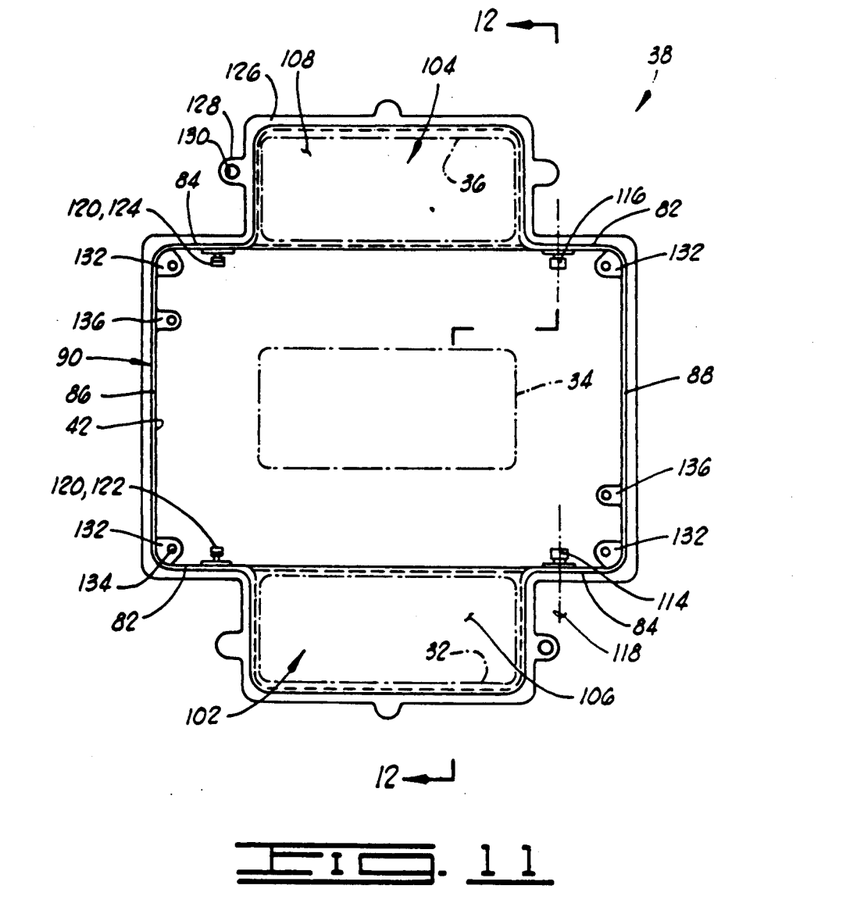
FIG. 11 is a plan view of the triple preset housing of FIG. 1.
Figure 12:
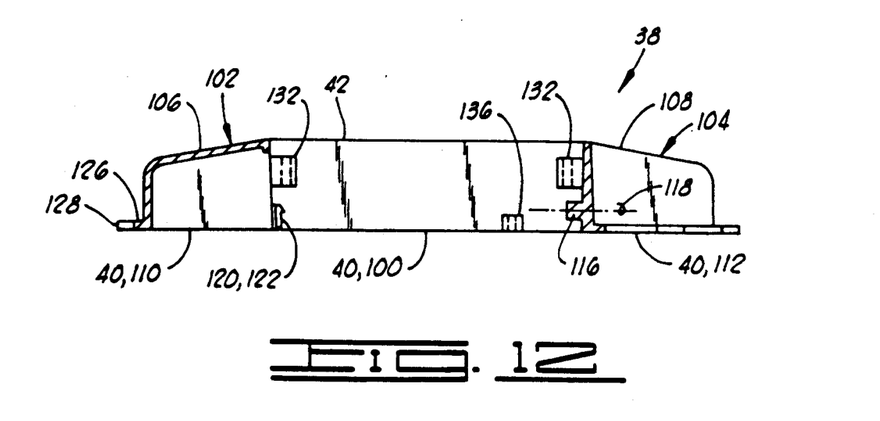
FIG. 12 is an elevation sectioned view taken along the irregular line 12—12 of FIG. 11.

Turning now to FIGS. 11 and 12, the details of the housing 38 will be described. The housing 38 includes first and second parallel longer walls 82 and 84 and third and fourth parallel shorter walls 86 and 88 joining ends of longer walls 82 and 84 to form a generally rectangular main housing section which can generally be referred to by the numeral 90 and which defines the generally rectangular shape open top 42 of housing 38 previously mentioned. Main housing section 90 can also be said to have a generally rectangular open bottom 100 defined within the four walls 82, 84, 86 and 88.

Housing 38 also includes first and second hollow housing wing sections generally designated as 102 and 104 extending generally perpendicularly outward from first and second walls 82 and 84, respectively. The wing sections 102 and 104 have closed tops 106 and 108, respectively, and open bottoms 110 and 112, respectively, contiguous with the open rectangular bottom 100 of main housing section 90. The contiguous rectangular bottom section 100 and bottoms 110 and 112 together define the open bottom 40 of housing 38.

Housing 38 includes first and second mutually aligned pivot posts 114 and 116 extending generally perpendicularly inward from first and second walls 82 and 84, respectively, defining a pivotal axis 118. The pivot posts 114 and 116 may be described as being located to one side of wing sections 102 and 104 closest to the fourth wall 88 of housing 38.

Housing 38 also includes a latch means 120 defined on at least one of the first and second walls 82 and 84 and located to an opposite side of the wing sections 102 and 104 closest to the third wall 86. Latch means 120 includes first and second opposed hooks 122 and 124 extending inwardly from the first and second walls 82 and 84, respectively.

The housing 38 includes an outwardly turned lip 126 extending around its perimeter, with several ears 128 defined on lip 126 having openings 130 which may be utilized to rivet the housing 38 onto the top wall 16 of duct 12.

In each of the four corners of the rectangular main housing section 90 is a mounting lug 132 having a screw hole 134 therein for receipt of the mounting screws 48 (see FIG. 1) which attach the trim ring 46 to the housing 38. Housing 38 also includes two grounding lugs 136. As seen in FIG. 2, a grounding strap 138 has one end attached to a grounding lug 136 by screw 140 and has its other end grounded to the duplex power outlet 56. A second grounding strap (not shown) is connected to the other grounding lug 136 and to the duplex power outlet 58.

In FIG. 11, the relative position of the access openings 32, 34 and 36 of duct 12 below the housing 38 are shown in phantom lines. The open bottom 40 of housing 38 is attached to the planar top 16 of duct 12 with the central access opening 34 lying generally centrally under the rectangular top opening 42 of the main housing section 90 and with each of the other access openings 32 and 36 lying under a respective one of the housing wing sections 102 and 104.

Referring now to FIGS. 13, 14 and 15, the details of construction of the divider means 68 will be described.

In FIG. 13, the divider 68 is shown in plan view, and the relative position of the access openings 32, 34 and 36 of duct 12 is again shown in phantom lines.

The divider 68 includes first and second spaced divider walls 142 and 144 which in part define the first, second and third chambers 70, 72 and 74, the location of which is generally indicated in FIG. 13, and which are better shown in FIG. 2. The divider walls 142 and 144 may be better described as first and second lower divider wall members 142 and 144.

Divider walls 142 and 144 span the central access opening 34 of duct 12 so that the first and third chambers 70 and 74 each overlie separate end portions of central access opening 34 and so that the second chamber 72 overlies both the two outer access openings 32 and 36.

The divider 68 also includes a bridging plate 146 extending between the first and second divider walls 142 and 144 and covering a middle portion of the central access opening 34 between walls 142 and 144 to isolate the second chamber 72 from the central cell 28 of duct 12.

The divider wall 142 includes a central transverse wall portion 148, with angled wall portions 150 and 152 extending from each end of central section 148, and with parallel end portions 154 and 156 extending from the angled portions 150 and 152.

Similarly, second divider wall 144 includes a central portion 158, angled portions 160 and 162, and parallel end portions 164 and 166.

An irregular shaped reinforcing web 168 underlies the angled portions 150 and 160 and parallel portions 154 and 164. A second irregular reinforcing web 170 similarly underlies angled portions 152 and 162 and the parallel portions 156 and 166 on the opposite side of divider member 68. As best seen in FIG. 15, the bridging plate 146 is raised a relatively small distance above bottoms 172 and 174 of the reinforcing webs 168 and 170, respectively, thus providing sufficient clearance for the grommet 44 (see FIG. 1) which is received in the central access opening 34.

The divider 68 has first and second partially open pivot notch means 176 and 178 defined in one end thereof in the parallel wall portions 164 and 166, for pivotally engaging the pivot posts 114 and 116 of housing 38 so that the divider means 68 can pivot about the pivotal axis 118 during installation of the divider means 68 within the housing 38. This is accomplished by first inserting the right end of divider means 68 as seen in FIG. 13 into the open top 42 of housing 38 and engaging the notches 176 and 178 with pivot posts 114 and 116, and then rotating the left end of divider means 68 downward into place within the housing 38.

The divider means 68 includes latch means 180 for latching the divider means 68 in an installed position as seen in FIG. 2 within the housing 38. The latch means 180 includes first and second hook receiving recesses 182 and 184 molded in the parallel wall portions 154 and 156, respectively, for latching receipt of the hooks 122 and 124, respectively, of housing 38. The hooks 122 and 124 and the hook receiving recesses 182 and 184 may be jointly referred to as a latch means 120, 180 for latching the divider means 68 in its installed position. The divider member 68 adjacent its first and second hook receiving recesses 182 and 184 is sufficiently flexible that it can flex resiliently inward to allow the hooks 122 and 124 to be received therein.

Figure 17:
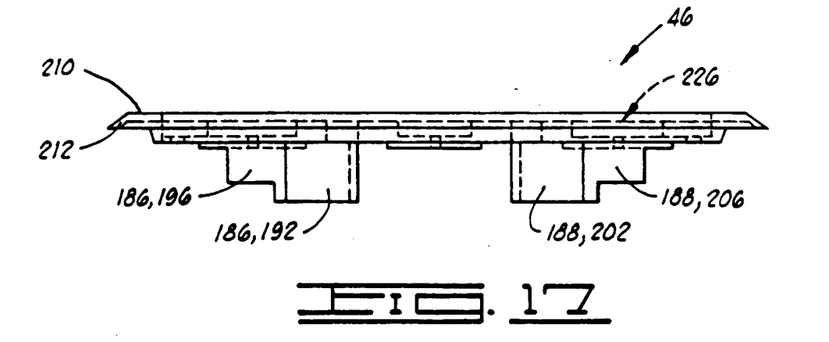
FIG. 17 is a front elevation view of the trim ring of FIG. 16.
Figure 18:
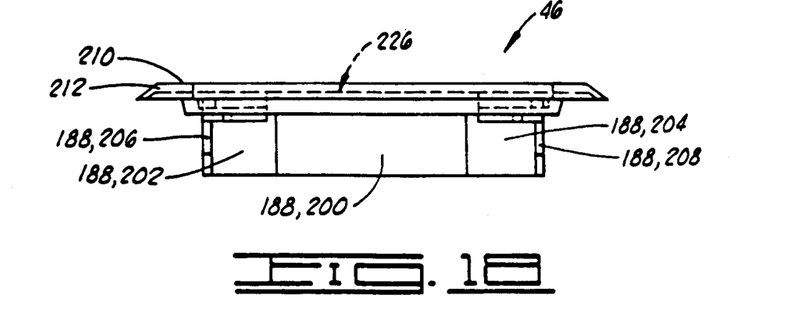
FIG. 18 is a right end elevation view of the trim ring of FIG. 16.

Referring now to FIGS. 16, 17 and 18, the details of construction of the trim ring 46 will be described. The trim ring 46 is generally rectangular in plan view as seen in FIG. 16, and has first and second upper divider wall members 186 and 188 which are generally complimentary to and received outside of the first and second lower divider wall members 142 and 144 to form a first telescoping divider wall 142, 186 and a second telescoping divider wall 144, 188, which telescoping divider walls are extendable to accommodate a plurality of different height access unit housings. As will be appreciated by those skilled in the art, different heights of the housing 38 will be provided for different thicknesses of concrete slab which are to be poured over the duct 12. Due to the telescoping wall arrangement, the divider means 68 and trim ring 46 may be utilized with two or more different heights of housing 38.

The first upper divider wall member 186 includes a transverse portion 190, first and second angled portions 192 and 194, and first and second parallel end portions 196 and 198.

Similarly, second upper divider wall member 188 includes transverse portion 200, first and second angled portions 202 and 204, and parallel end portions 206 and 208.

The trim ring 46 includes a generally rectangular frame having an upper surface 210 and having a beveled outwardly extending flange 212.

Each of the mounting means 50, 52 and 54 of trim ring 46 has a rectangular opening 214, 216, and 218, respectively, associated therewith.

The trim frame 46 includes a recessed surface generally designated by the numeral 220 including a recessed floor surface portion 222 and a recessed side wall surface portion 224 defining an upwardly open recess 220 in the trim ring 46.

The rectangular openings 214, 216 and 218 of mounting means 50, 52 and 54, respectively, are all defined through the floor surface portion 222 of trim ring 46.

With reference to FIG. 16, the duplex outlets 56 and 58 fit downward into the openings 214 and 218. The mounting screws for duplex outlet 56 fit within holes 228 in trim frame 46. The mounting screws for outlet 58 fit within holes 230.

Mounting holes 298 are provided in each corner of trim ring 46 for receipt of the mounting screws 48 (see FIG. 2) which attach the trim ring 46 to the housing 38. A ground strap receiving recess 300 extends from each of the mounting holes 298 toward each of the holes 228 for receipt of an alternative design of a ground strap (not shown) to ground the outlet devices 56 and 58 to the housing 38 through the mounting screws 48. It is noted that the ground strap recesses 300 are not shown in FIGS. 1 and 2. In FIGS. 1 and 2 the ground strap 138 is used.

With reference to FIG. 16, the face plates 76 and 78 of FIG. 1 are received closely in the left and right hand ends of the generally rectangular upwardly open recess 220 to cover the mounting means 50 and 52 and the devices 56 and 58, respectively, received therein. The communications outlet plate 60 is received in the central portion of upwardly open recess 220 between the two face plates 76 and 78.

Figure 19:
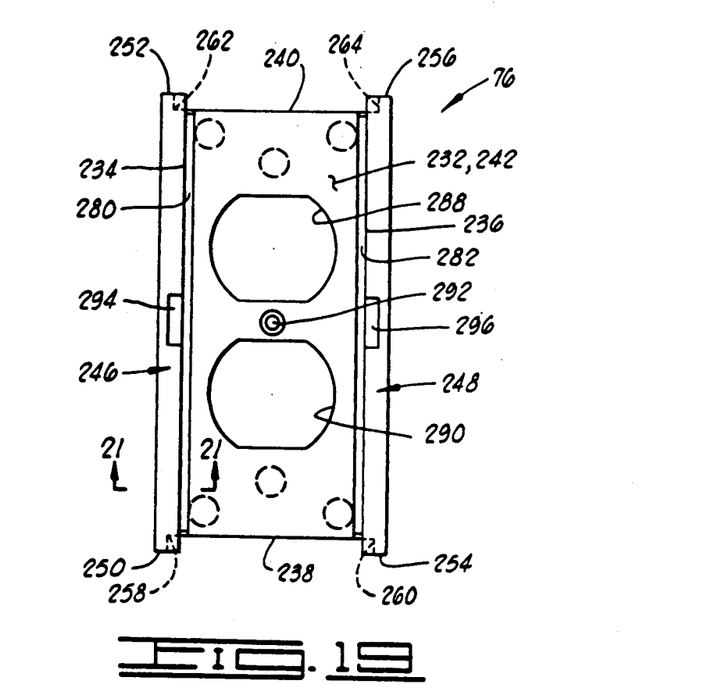
FIG. 19 is a plan view of the face plate of FIG. 1.
Figure 20:
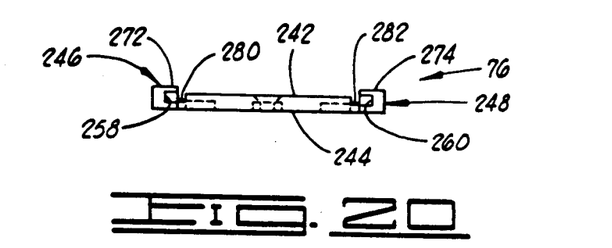
FIG. 20 is a front elevation view of the face plate of FIG. 19.
Figure 21:
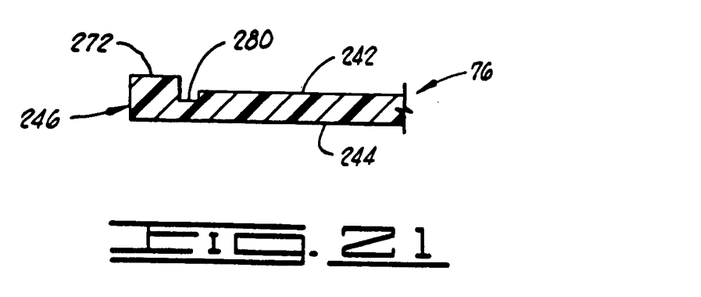
FIG. 21 is a sectioned elevation partial view taken along line 21—21 of FIG. 19 showing a detail of the groove adjacent one of the rib portions of the face plate.

The details of construction of one of the face plates 76 are shown in FIGS. 19, 20 and 21. The details of construction of one of the associated cover lids 82 are shown in FIGS. 7, 8, 9 and 10.

The face plate 76 has a generally rectangular plate portion 232 having two opposite side edges 234 and 236 and two opposite end edges 238 and 240, and having a top surface 242 and a bottom surface 244. Face plate 76 also includes first and second substantially parallel raised rib portions 246 and 248, respectively, extending higher than the top surface 242 along the opposite side edges 234 and 236, respectively, of the plate portion 232. The rib portion 246 has first and second ends 250 and 252 overhanging generally horizontally beyond the edges 238 and 240. Second rib portion 248 includes ends 254 and 256 which similarly overhang edges 238 and 240.

As best seen in FIG. 20, the ends 250 and 254 of first and second rib portions 244 and 246 have first and second hinge pin receiving cavities 258 and 260, respectively, defined therein which are open toward an adjacent area of the side wall surface portion 224 of recessed surface 220 of trim ring 46. Similar cavities 262 and 264 are defined in the opposite ends 252 and 256 of first and second rib portions 246 and 248, respectively.

The cover lid 82 of FIGS. 7-10 has first and second oppositely directed hinge pins 266 and 268 extending therefrom, which are received in the first and second hinge pin receiving cavities 258 and 260 of face plate 76 and are trapped therein by the adjacent side wall surface portion 224 of recess surface 220 of trim ring 46.

Figure 5:
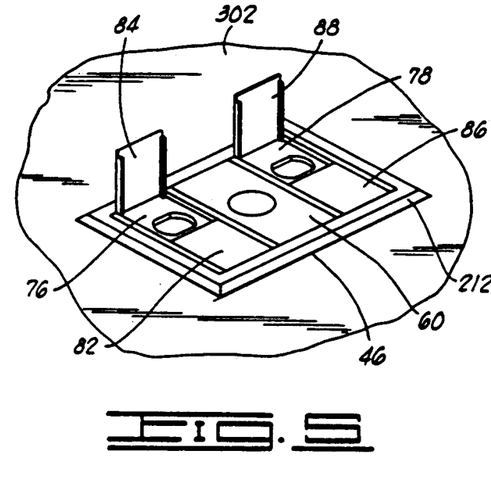
FIG. 5 is an isometric top view of the triple flush fitting in place upon a carpeted floor.

In FIG. 5, the trim ring 46 with the assembled face plates 76 and 78 with their associated cover lids, and the communications outlet plate 60 are all shown installed on top of a floor covering 302, typically carpet 302. The outwardly extending beveled flange 212 provides a neat trim adjacent the hidden edges of the carpet 302.

Figure 6:
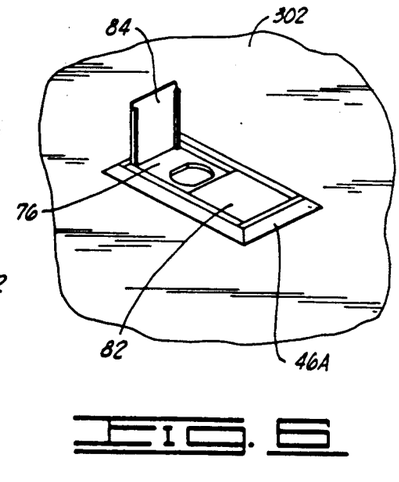
FIG. 6 is an isometric top view of a single flush fitting incorporating a trim ring, face plate and cover lid construction similar to that of the triple fitting of FIG. 5.
Figure 7:
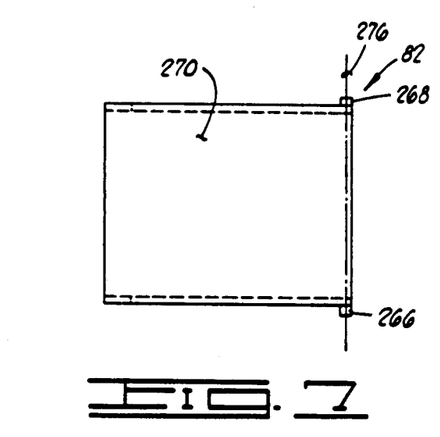
FIG. 7 is a plan view of a cover lid.
Figure 8:
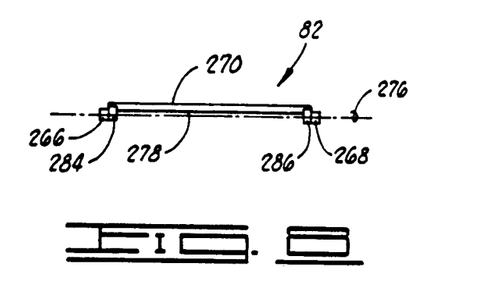
FIG. 8 is a right end elevation view of the cover lid of FIG. 7.
Figure 9:
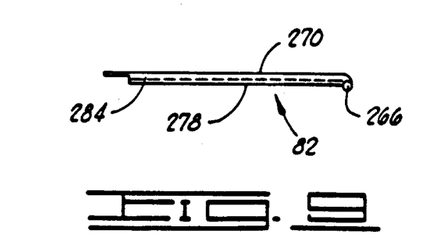
FIG. 9 is a side elevation view of the cover lid of FIG. 7.
Figure 10:
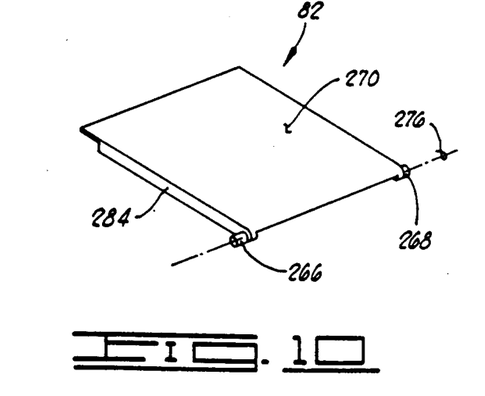
FIG. 10 is an isometric top view of the cover lid of FIG. 7.

FIG. 6 is a view similar to FIG. 5 of an alternative embodiment of the present invention wherein a modified trim ring 46A for use with a single duplex outlet is shown. A single face plate 76 with cover lids 82 and 84 is mounted therein.

When the face plates 76 and 78 are assembled with their respective cover lids within the trim ring 46 as shown in FIG. 5, the cover lids such as 82 and 84 are pivotable upon their respective hinge pins between a closed position like that shown in FIG. 5 for cover lid 82 and an open position like that shown in FIG. 5 for cover lid 84. In the closed position, the cover lids each cover one-half of the face plate 76, and in the open position they expose the respective half of the face plate and one of the sockets of the underlying duplex electrical outlet 56. When the cover lids are in their closed position, they are received between the first and second raised rib portions 246 and 248 of face plate 76 with a top surface 270 of the cover lid 82 substantially flush with top surfaces 272 and 274 of the first and second raised rib portions 246 and 248, respectively.

The pivot pins 266 and 268 of cover lid 82 define a pivotal axis 276 of cover lid 82 located at an elevation lower than a bottom surface 278 of the cover lid 82.

The plate portion 232 of face plate 76 has first and second upwardly open grooves 280 and 282 defined therein adjacent the first and second rib portions 246 and 248, respectively. The cover lid 82 includes first and second parallel flanges 284 and 286 extending downward from opposite edges of the cover lid 82 and received in the first and second grooves 280 and 282, respectively, when the cover lid 82 is in its said closed position.

Face plate 76 has two openings 288 and 290 defined through the rectangular plate portion 232 to provide access to the duplex power outlet device 56. A mounting hole 292 is provided for receipt of the screw 80 (see FIG. 1) for attaching the face plate 76 to the outlet device 56.

Two recesses 294 and 296 are provided in rib portions 246 and 248, respectively, so that the lids 82 and 84 can be easily raised by inserting a fingernail or a thin tool under the edge of the lids.

It will be appreciated by those skilled in the art that face plates 76 and 78 may be replaced with modified face plates designed to receive other types of electrical outlets rather than the duplex outlet devices 56 and 58.

Manner Of Assembly

Figure 3:
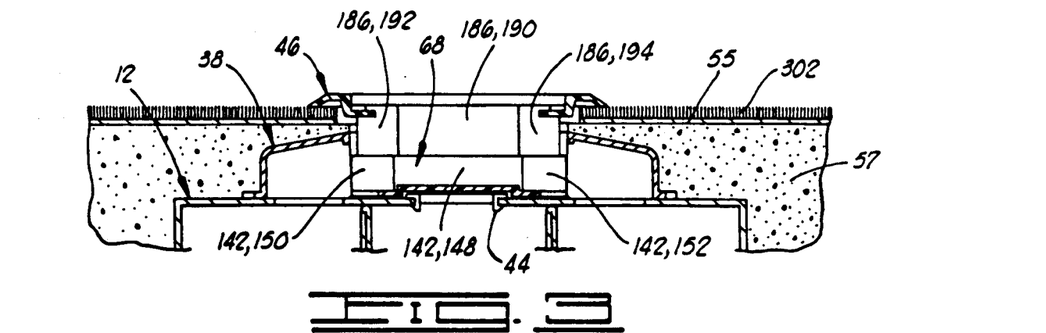
FIG. 3 is an elevation sectioned view of the duct, preset housing, and bridge member of FIG. 2 taken along line 3—3 of FIG. 2.
Figure 4:
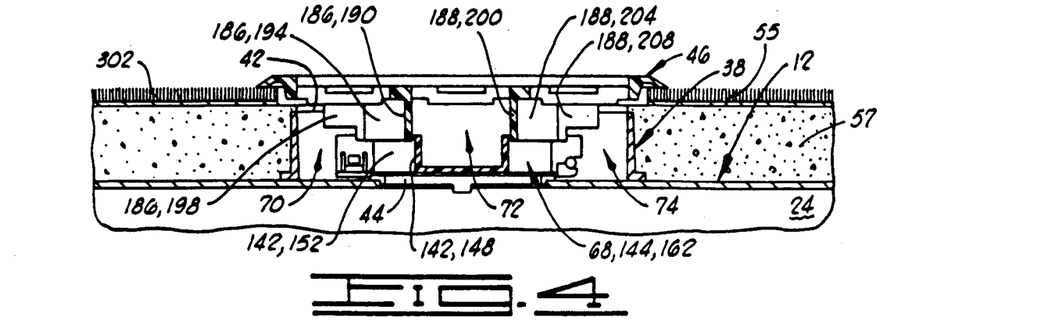
FIG. 4 is an elevation sectioned view of the duct, preset housing, and bridge member of FIG. 2 taken along line 4—4 of FIG. 2.

The electrical duct system 10 is generally assembled in the following manner. As will be appreciated by those skilled in the art, prior to pouring the concrete slab floor 57, a grid work of ducts 12 having a plurality of preset housings 38 spaced along their length will be set in place. The open top 42 of each of the preset housings 40 will initially be covered with a plastic cap, and the concrete slab 57 will extend slightly above the top 42 as seen in FIGS. 3 and 4 so that there is a thin layer of concrete covering the cap.

When it is desired to activate any particular one of the preset housings 38, the thin layer of concrete located thereabove will be broken away and the cover cap will be removed exposing the open upper end 42 of preset housing 38.

Then, the grommet 44 will be installed in the center access opening 34, and appropriate high potential electrical cables 76 will be pulled through the central access opening 34. Ample cable length should be pulled to wire the duplex outlets 56 and 58.

Next, the ground straps 138 (see FIG. 2) are connected to the grounding lugs 136 in preset housing 38. One ground strap 138 is attached to each grounding lug 136.

The high potential cable 76 to be connected to each of the duplex receptacles 56 and 58 should be pulled to opposite ends of the access opening 34. The divider unit 68 is then installed over the grommet 44 by engaging the pivot notches 176 and 178 with the pivot posts 114 and 116 and then swinging the divider 68 downward to latch over the hooks 122 and 124. The high potential cables 76 should exit from the end portions of central access opening 34 on opposite ends of the grommeted central access opening 34.

Low potential cables (not shown) can then be pulled through the outer access openings 32 and 36.

Next, the trim ring 46 is attached to the preset housing 38 with the mounting screws 48. It is important that the high potential cabling 76 be threaded through the appropriate openings 214 and 218 in the trim ring 46, and that the low potential cabling be threaded through the opening 216 in trim ring 46.

The high potential cabling 76 is then connected to the appropriate terminals on the duplex outlets 56 and 58, and the low potential cabling is either threaded through the opening 64 in communications outlet plate 60 or attached to an appropriate communications outlet plug located therein.

Then, the duplex outlets 56 and 58 and the communications mounting plate 60 are mounted onto the trim ring 46, taking care not to pinch any of the cabling between those devices and the trim ring 46.

Next, the face plates 76 and 78 with their associated cover lids such as 82 and 84 are assembled and installed upon the trim ring 46. The final assembly will appear as shown in FIG. 5.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. An electrical duct system to be placed in a floor, comprising:

a duct having a bottom wall, a top wall, first and second side walls joining said bottom and top walls, and first and second interior walls dividing an interior of said duct into three parallel cells extending parallel to a length of said duct, said three cells being a central cell and two outer cells, said top wall having a central access opening and two outer access openings defined therethrough and communicated with said central cell and said two outer cells, respectively;

an access unit housing having an open bottom and an open top, said housing being attached to said top wall of said duct so that said open bottom of said housing is communicated with said central and two outer access openings;

a trim ring connected to said open top of said housing and having first, second and third mounting means defined therein for mounting outlet devices therein substantially flush with a surface of said floor, said first, second and third mounting means being aligned in a direction generally parallel to said length of said duct with said second mounting means located in line between said first and third mounting means; and a divider means, located in said housing, for dividing an interior of said housing into spaced first and third chambers, each partially overlying and communicated with said central access opening and isolated from said two outer access openings, and a second chamber extending between said first and third chambers and communicated with both said two outer access openings and isolated from said central access opening, said first, second and third chambers being communicated with said first, second and third mounting means, respectively, of said trim ring.

2. The system of claim 1, wherein:
said top wall of said duct lies in substantially a single plane.

3. The system of claim 1, wherein:
said central cell of said duct has high potential electrical cables located therein;
said first and third chambers of said housing are high potential power outlet chambers; and
said first and third mounting means of said trim ring are means for mounting duplex power outlets.

4. The system of claim 1, wherein said divider means further includes:
first and second spaced divider walls at least in part defining said first, second and third chambers, said divider walls both spanning said central access opening of said duct so that said first and third chambers each overlie separate end portions of said central access opening and so that said second chamber overlies both said two outer access openings; and a bridging plate extending between said first and second divider walls and covering a middle portion of said central access opening therebetween to isolate said second chamber from said central cell of said duct.

5. The system of claim 4, wherein:

said first and second divider walls of said divider means are further characterized as first and second lower divider wall members; and said trim ring includes first and second upper divider wall members extending downwardly therefrom and cooperating with said lower divider wall members to define said first, second and third chambers.

6. The system of claim 5, wherein:

said upper divider wall members and said lower divider wall members form first and second telescoping divider walls extendable to accommodate a plurality of different available height access unit housings.

7. The system of claim 1, wherein:

said access unit housing includes a pair of aligned pivot posts extending inwardly therefrom and defining a pivotal axis; and said divider means has partially open pivot notch means, defined in one end thereof, for pivotably engaging said pivot posts, so that said divider means can pivot about said pivotal axis during installation of said divider means within said housing, and latch means for latching said divider means in an installed position within said housing.

8. The system of claim 7, wherein:

said access unit housing includes an inwardly extending hook arranged to be engaged by said latch means of said divider means when said divider means is in its said installed position.

9. The system of claim 1, wherein:

said first mounting means of said trim ring includes a recessed surface defining an upwardly open recess in said trim ring; and said system further comprises:

a face plate received in said recess, said face plate having at least first and second hinge pin receiving cavities defined therein, at least said first cavity being open toward an adjacent area of said recessed surface; and a cover lid having first and second oppositely directed hinge pins extending therefrom, said first and second hinge pins being received in said first and second hinge pin receiving cavities, respectively, said first hinge pin being trapped in said first cavity of said face plate by said adjacent area of said recessed surface of said trim ring, said cover lid being pivotable upon said hinge pins between a closed position covering at least a portion of said face plate and an open position wherein said portion of said face plate is exposed.

10. The system of claim 9, wherein:

said recessed surface of said trim ring includes a recessed floor surface portion and a recessed side wall surface portion extending upward from said floor surface portion, and said area of said recessed surface adjacent said first cavity of said face plate is part of said recessed side wall surface portion.

11. The system of claim 10, wherein:

said face plate includes a generally rectangular plate portion having two opposite side edges and two opposite end edges and having a top surface and a bottom surface, and said face plate includes first and second substantially parallel raised rib portions extending higher than said top surface along said opposite side edges of said plate portion, said rib portions each having an end overhanging generally horizontally beyond one of said end edges of said plate portion, said first and second cavities being defined in said overhanging ends of said first and second raised rib portions, respectively; and said cover lid, when in its said closed position, is received between said first and second raised rib portions with a top surface of said cover lid substantially flush with a top surface of each of said first and second rib portions.

12. The system of claim 11, wherein:

said pivot pins define a pivotal axis of said cover lid located at an elevation lower than a bottom surface of said cover lid.

13. The system of claim 11, wherein:

said plate portion of said face plate has first and second upwardly open grooves defined therein adjacent said first and second rib portions; and said cover lid includes first and second parallel flanges extending downward from opposite edges of said cover lid and received in said first and second grooves, respectively, when said cover lid is in its said closed position.

14. The system of claim 1, wherein:

said central and two outer access openings of said duct are laterally aligned substantially identical access openings.

15. The system of claim 1, further comprising:

first and second duplex power outlet devices mounted in each of said first and third mounting means, respectively, of said trim ring;

first and second face plates located within said trim ring on top of each of said first and second outlet devices, respectively; and first and second pairs of pivotable lids operably associated with said first and second power outlet devices for covering said outlet devices.

16. A floor fitting apparatus, comprising:

a trim ring having a recessed surface defining an upwardly open recess in said trim ring;

a face plate received in said recess, said face plate having at least first and second hinge pin receiving cavities defined therein, at least said first cavity being open toward an adjacent area of said recessed surface; and a cover lid having first and second oppositely directed hinge pins extending therefrom, said first and second hinge pins being received in said first and second hinge pin receiving cavities, respectively, said first hinge pin being trapped in said first cavity of said face plate by said adjacent area of said recessed surface of said trim ring, said cover lid being pivotable upon said hinge pins between a closed position covering at least a portion of said face plate and an open position wherein said portion of said face plate is exposed.

17. The apparatus of claim 16, wherein:

said recessed surface of said trim ring includes a recessed floor surface portion and a recessed side wall surface portion extending upward from said floor surface portion, and said area of said recessed surface adjacent said first cavity of said face plate is part of said recessed side wall surface portion.

18. The apparatus of claim 17, wherein:

said face plate includes a generally rectangular plate portion having two opposite side edges and two opposite end edges and having a top surface and a bottom surface, and said face plate includes first and second substantially parallel raised rib portions extending higher than said top surface along said opposite side edges of said plate portion, said rib portions each having an end overhanging generally horizontally beyond one of said end edges of said plate portion, said first and second cavities being defined in said overhanging ends of said first and second raised rib portions, respectively; and said cover lid, when in its said closed position, is received between said first and second raised rib portions with a top surface of said cover lid substantially flush with a top surface of each of said first and second rib portions.

19. The apparatus of claim 18, wherein:

said pivot pins define a pivotal axis of said cover lid located at an elevation lower than a bottom surface of said cover lid.

20. The apparatus of claim 18, wherein:

said plate portion of said face plate has first and second upwardly open grooves defined therein adjacent said first and second rib portions; and said cover lid includes first and second parallel flanges extending downward from opposite edges of said cover lid and received in said first and second grooves, respectively, when said cover lid is in its said closed position.

21. A triple preset comprising:

first and second parallel longer walls and third and fourth parallel shorter walls joining ends of said longer walls to form a generally rectangular main housing section having an open bottom and an open top;

first and second hollow housing wing sections extending generally perpendicularly outward from said first and second walls, respectively, said wing sections each having a closed top and having an open bottom contiguous with said open bottom of said main housing section;

first and second mutually aligned pivot posts extending generally perpendicularly inward from said first and second walls, respectively, to one side of said wing sections closest to said fourth wall; and latch means, defined on at least one of said first and second walls and located to an opposite side of said wing sections closest to said third wall.

22. The triple preset of claim 21, wherein:

said latch means includes first and second opposed hooks, extending inwardly from said first and second walls, respectively.

23. The triple preset of claim 21, further comprising:

divider means, pivotably mounted within said main housing section upon said pivot posts and releasably latched in an installed position by said latch means, for dividing an interior of said preset into first and second spaced power chambers adjacent said third and fourth walls, respectively, and a third auxiliary chamber including said housing wing sections and an intermediate portion of said main housing section.

24. The triple preset of claim 23, in combination with a duct, wherein:

said duct includes a generally planar top and has an interior divided into three parallel cells, said planar top having three adjacent substantially identical access openings defined therethrough, each of which is communicated with a respective one of said three cells; and said open bottom of said preset is attached to said planar top of said duct with a central one of said access openings lying generally centrally under said open top of said main housing section, and with each of the other two of said access openings lying under a respective one of said housing wing sections.

* * * * *